Feb. 4, 1936.  H. SMITH  2,029,595
THERMOSTAT CONSTRUCTION
Filed July 17, 1933  2 Sheets—Sheet 1
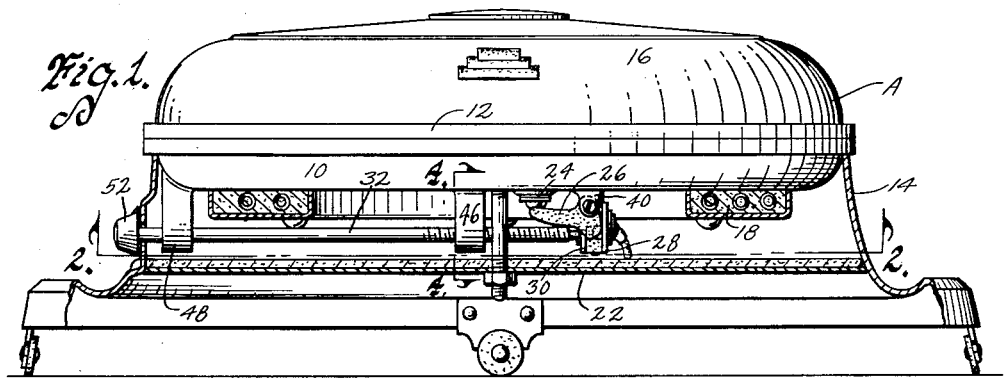
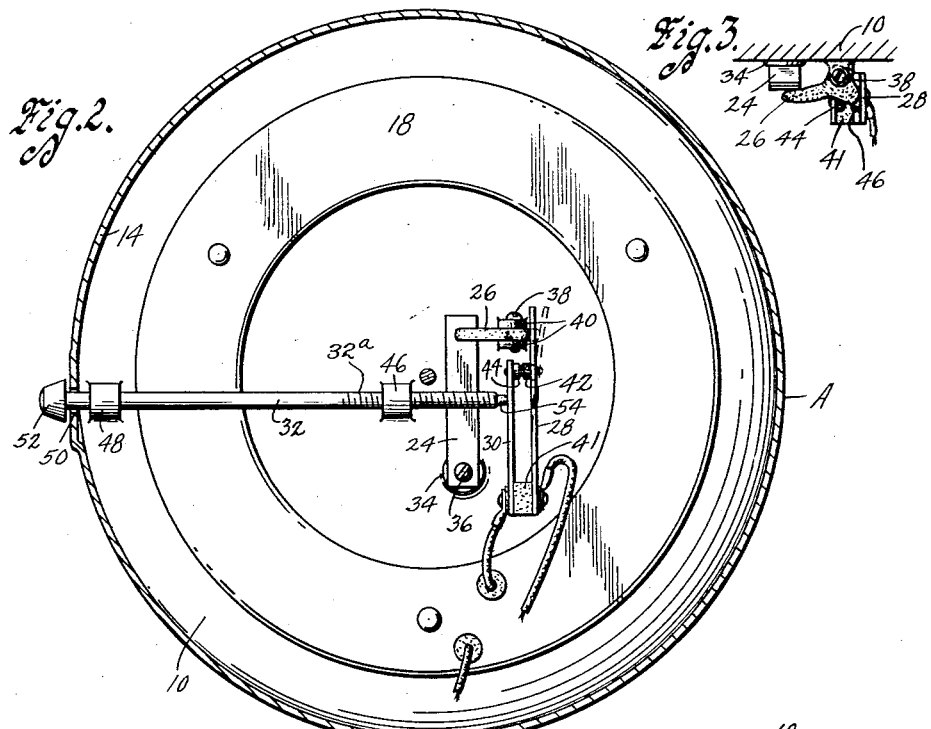
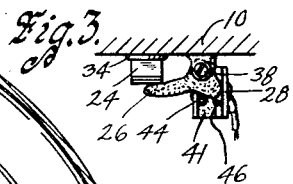
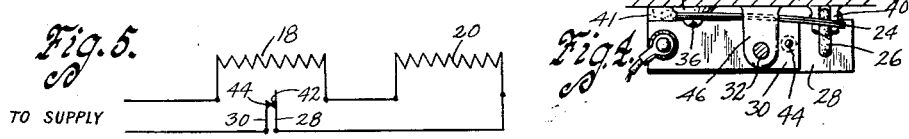
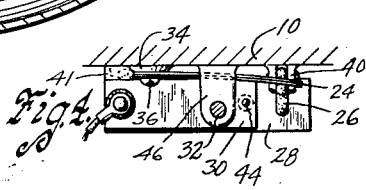
Inventor
Howard Smith
By Bair, Freeman & Sinclair
Attorneys Feb. 4, 1936.  H. SMITH  2,029,595
THERMOSTAT CONSTRUCTION
Filed July 17, 1933  2 Sheets-Sheet 2
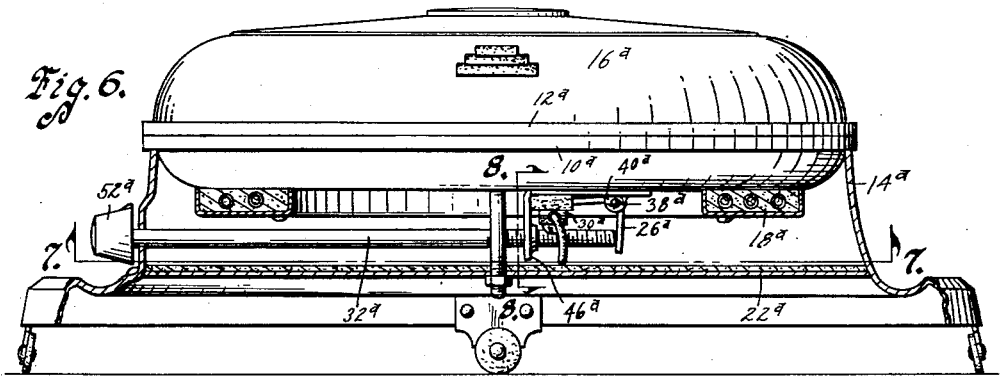
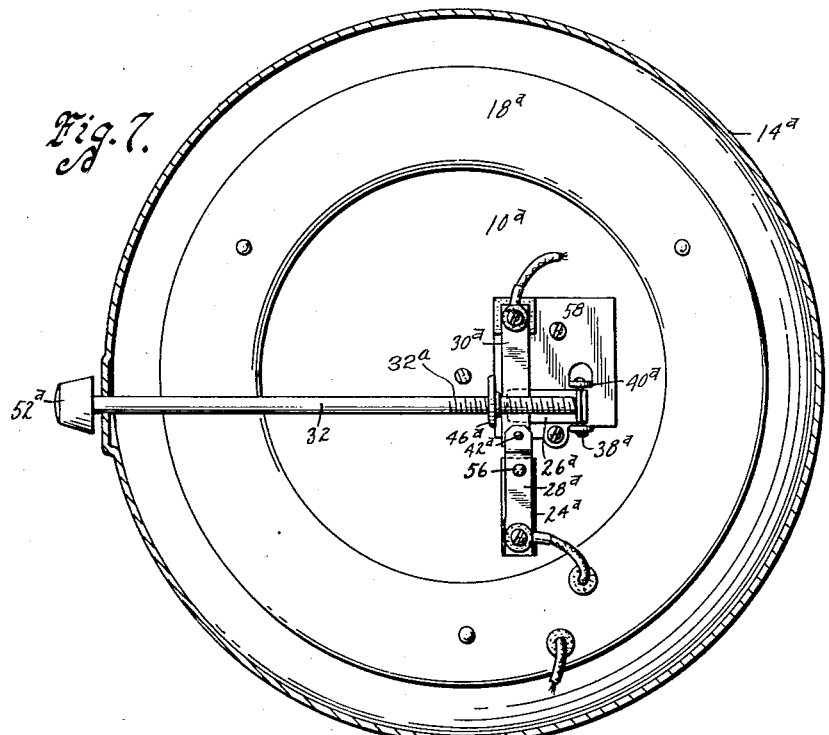
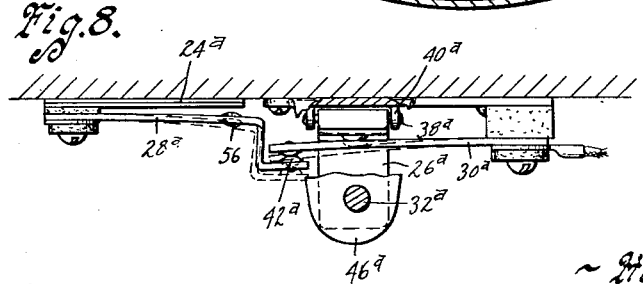
Inventor
~ Howard Smith ~
By Bair, Freeman & Sinclair
Attorneys Patented Feb. 4, 1936

2,029,595

UNITED STATES PATENT OFFICE 2,029,595

THERMOSTAT CONSTRUCTION

Howard Smith, Belleville, Ill., assignor to Knapp-Monarch Company, Belleville, Ill., a corporation of Missouri Application July 17, 1933, Serial No. 680,746

5 Claims. (Cl. 200—138)

An object of my invention is to provide a thermostat construction which is simple and durable and especially adapted for controlling electric heating elements of cooking or other electrical appliances.

A further object is to provide a thermostat construction in which the heat responsive element, such as a bimetal bar, is under no strain during the maximum part of its warping movement, whereby it is highly sensitive to temperature changes of the cooking plate or other surface, the temperature of which is to be automatically controlled.

A further object is to provide a spring closed contact carrier and a bimetal element which operatively engages it only after the bimetal element has warped to the desired circuit opening position.

Still a further object is to provide a thermostat which is operable within the confined space between a cooking plate and a cover plate therefor for instance, yet which gives the desired movement of the parts for separating the contacts for the heating element.

Still a further object is to provide a heat responsive element which is movable toward and away from a cooking plate or the like, it being responsive to the temperature thereof and mechanism being provided for transforming the motion just mentioned to motion in a direction substantially parallel with the cooking plate, the last mentioned motion being that of the contact carrier and it being desirable in the direction referred to so that a screw-threaded adjusting rod can be used therefor and can be arranged in a plane parallel with the cooking plate.

Still a further object is to provide a modified form of the invention in which the contact elements are arranged to move toward and away from the cooking plate and adjustment is effected through the medium of a bell crank for transforming motion of an adjusting rod parallel with the cooking plate into adjusting motion for the contacts toward and away from the plate.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of a waffle iron with my thermostat construction applied thereto, the lower casing and heating element of the iron being shown sectioned.

Figure 2 is a sectional view on the line 2—2 of Figure 1 showing the cooking plate, heating element and thermostat construction as a bottom plan view.

Figure 3 is a view of a portion of Figure 1 showing the parts in a different position.

Figure 4 is a sectional view on the line 4—4 of Figure 1 showing the parts in an intermediate position between the positions of Figure 1 and Figure 3.

Figure 5 is an electrical diagrammatic view of the heating elements and of the circuit breaker of the thermostat construction.

Figure 6 is a side elevation of a waffle iron showing the modified form of my thermostat construction applied thereto, the lower casing and heating element of the iron being shown in section.

Figure 7 is a sectional view on the line 7—7 of Figure 6 showing the cooking plate, heating element and thermostat construction as a bottom plan view; and Figure 8 is an enlarged sectional view on the line 8—8 of Figure 6 showing details of the thermostat construction.

On the accompanying drawings, I have used the reference numeral 10 to indicate a cooking plate. As illustrated, it is the bottom grid of a waffle iron A, the top grid of which is shown at 12. Although a waffle iron is disclosed, it is to be understood that my thermostat construction can be used with other cooking plates or electrically heated members used for cooking or other purposes.

A casing 14 is shown for the grid plate 10 and a casing 16 covers the grid plate 12. The heating element for the grid plate 10 is indicated at 18, while in Figure 5, a heating element 20 is shown for the grid plate 12.

The casing 14 has a bottom or cover plate 22. The foregoing is ordinary waffle iron construction and forms no part of my invention.

My thermostat construction comprises briefly a heat responsive element 24, such as a bimetal bar, a bell crank 26, a contact carrier 28, a second contact carrier 30 and an adjusting rod 32. The bimetal element 24 is preferably supported in position adjacent the plate 10, such as by securing it to a boss 34 by a screw 36. With reference to the plate, it is preferably placed so that upon a rise of temperature, it warps away from rather than toward the plate whereby the necessary space for its movement is minimized.

The free end of the bimetal element 24 is adapted to engage one arm of the bell crank 26.

The bell crank is pivoted on a screw 38 or the like supported by ears 40 which may conveniently extend from the plate 10. The other end of the bell crank lever 26 is adapted for engagement with the contact carrier 28.

The contact carriers 28 and 30 are insulated from each other and may also be supported by an insulating block 41 secured to the plate 10. Movable and stationary complementary contacts 42 and 44 are formed or secured on the contact carriers 28 and 30, respectively.

The contact carriers 28 and 30 are of spring material and movable for adjusting and contact separating purposes in a plane parallel to the plate 10. This mounting of the carriers on edge so that they move in the plane mentioned minimizes the space required for their operation as compared with contact carriers which would be movable away from the plate 10.

The adjusting rod 32 is screw-threaded, as indicated at 32a, the threads coacting with a threaded lug 46 extending from the plate 10. A second lug 48 supports the rod 32 adjacent its outer end, said end extending outwardly through an opening 50 in the casing 14 and having a control knob 52 secured thereto. An insert of insulation 54 is associated with the inner end of the adjustment rod 32 to prevent a short circuit between the contact carrier 30 and the rod. The bell crank 26 may be made of insulating material for preventing a short circuit between the contact carrier 28 and the ears 40.

The movement of the contact carriers for adjusting purposes in a plane parallel with the plate 10 makes it possible to use the adjusting rod 32 as disclosed without having to provide complicated mechanism as would be the case if the longitudinal movement of the rod had to be transmitted to a contact carrier adjustable toward and away from the plate 10.

The bell crank lever 26 however permits the contact carriers 28 and 30 to be movable in the proper plane for adjustment from the rod 32, yet operable from the bimetal element 24 when it moves away from the plate 10.

In the modified form of my construction, switch blades 28a and 30a are substituted for the blades 28 and 30 in Figure 2. Other parts of Figures 6, 7 and 8 having characteristics similar to the characteristics of the parts in Figures 1 to 5 are given the same reference numerals with the addition of the distinguishing characteristic a.

The blades 28a and 30a move substantially perpendicular to a cooking plate 10a. Thus a bimetal element 24a can contact directly with an insulating button 56 of the leaf spring 28a for separating contacts 42a and 44a.

I have provided in this form of construction a bracket 58 on which the switch arm 30a and a bell crank 26a are mounted. The bell crank 26a is pivoted on a pin 38a carried by ears 40a formed of the material of the bracket 58. A lug 46a for an adjusting shaft 32a is also formed of the material of the bracket 58. Thus the bell crank 26a is utilized for transforming motion of the adjusting rod to the adjustable switch blade 30a rather than of the bimetal element to the switch blade 28a, as in Figures 1 to 4.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In an appliance having an electrically heated plate, a thermostat construction comprising leaf springs adjacent said plate and in planes parallel thereto, contacts thereon, means responsive to temperature of the plate for separating said contacts and means for adjusting said contacts comprising a bell crank pivoted to said plate, having a first leg parallel thereto and engaging one of said leaf springs and a second leg extending substantially perpendicular from said plate and an adjusting shaft extending from the peripheral edge of said plate, parallel thereto and engaging said second leg, said shaft being longitudinally movable to swing said bell crank about its pivot.

2. In an appliance having an electrically heated plate, a thermostat construction comprising leaf springs adjacent said plate and in planes parallel thereto, contacts thereon, a bimetal element responsive to the temperature of said plate for separating said contacts and means for adjusting said contacts comprising a bell crank pivoted to said plate, having a first leg parallel thereto and engaging one of said leaf springs and a second leg extending substantially perpendicular from said plate and an adjusting shaft extending from peripheral edge of said plate, parallel thereto and engaging said second leg, said bimetal element underlying one of said leaf springs, being normally spaced therefrom and engageable therewith only when it warps to circuit opening position.

3. In an appliance having an electrically heated plate, a thermostat construction comprising contacts adjacent said plate, a heat responsive control element cooperating with said contacts to open them at a predetermined temperature being reached by said plate, an adjusting control element for said contacts, said adjusting control element extending parallel to said plate and at substantially right angles to the travel of said heat responsive control element and a bell crank connection between said adjusting control element and said contacts, one arm thereof being movable by said adjusting control element in a direction parallel with said plate and the other arm thereof moving said contacts toward or away from said plate.

4. In an appliance having an electrically heated plate, a thermostat construction comprising a circuit breaker adjacent said plate, a heat responsive control element for said circuit breaker, an adjusting control element for said circuit breaker, said heat responsive control element comprising a bimetal member mounted on said plate and warping away from said plate upon a rise in temperature, said adjusting control element extending parallel to said plate and at substantially right angles to the travel of said heat responsive control element and a bell crank connection between said adjusting control element and said circuit breaker, one arm thereof being movable by said adjusting control element in a direction parallel with said plate and the other arm thereof moving said circuit breaker toward or away from said plate, said circuit breaker being urged toward closed position and separable by said bimetal member upon warping thereof away from said plate to a position corresponding to the temperature at which it is desired to open said circuit breaker.

5. In an appliance having an electrically heated plate, a thermostat construction comprising contacts adjacent said plate, a heat responsive control element for said contacts, an adjusting control element for said contacts, said heat responsive control element cooperating with said contacts to separate them upon a predetermined rise in temperature of said plate, said adjusting control element extending parallel to said plate and at substantially right angles to the travel of said heat responsive control element and a bell crank connection between said adjusting control element and said contacts, said adjusting control element comprising a threaded rod movable longitudinally upon rotation to move one arm of said bell crank in a direction parallel to said plate and the other arm toward or away from said plate and a control knob thereon adjacent the edge of said plate.

HOWARD SMITH.